R. T. F. DODDS.
ROLLER MILL.
APPLICATION FILED JAN. 4, 1916.
1,218,933.
Patented Mar. 13, 1917.
5 SHEETS—SHEET 1.
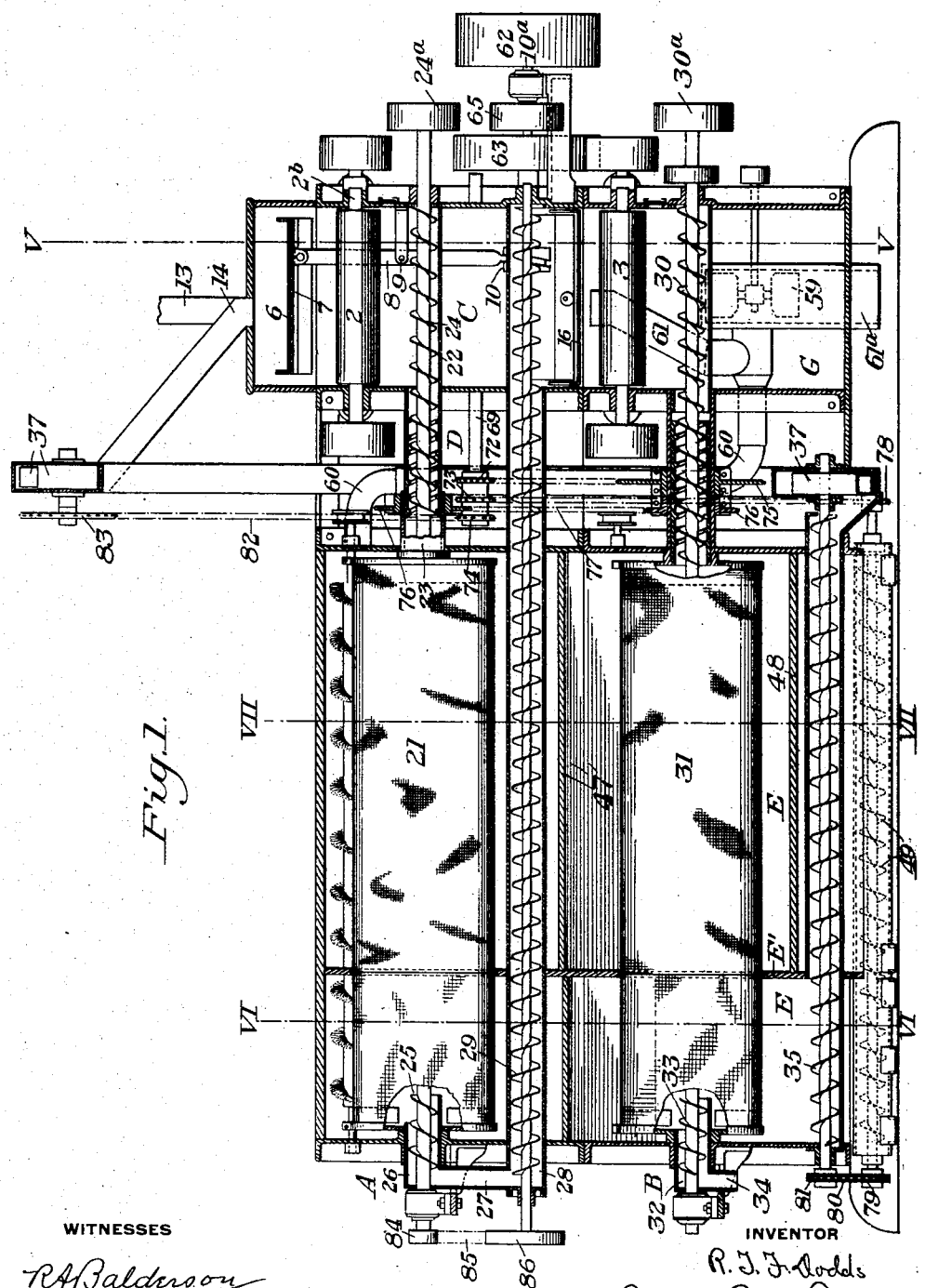
WITNESSES
R A Balderson
Jesse B. Heller
INVENTOR
R. T. F. Dodds
by Bakewell, Byrnes & Parmelee
Attys.

R. T. F. DODDS.
ROLLER MILL.
APPLICATION FILED JAN. 4, 1916.
1,218,933.
Patented Mar. 13, 1917.
5 SHEETS—SHEET 2.
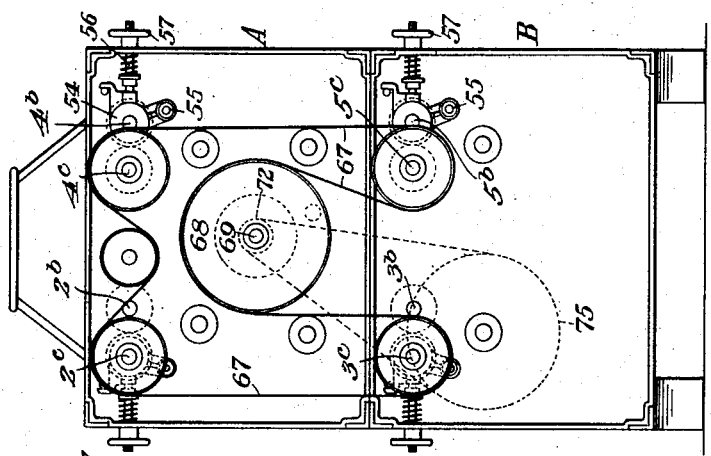
WITNESSES
R A Balderson
Jesse B. Hiller
INVENTOR
R. J. F. Dodds
by Bakewell Byrnes Parmlee
Attys.

R. T. F. DODDS.
ROLLER MILL.
APPLICATION FILED JAN. 4, 1916.
1,218,933.
Patented Mar. 13, 1917.
5 SHEETS—SHEET 3.
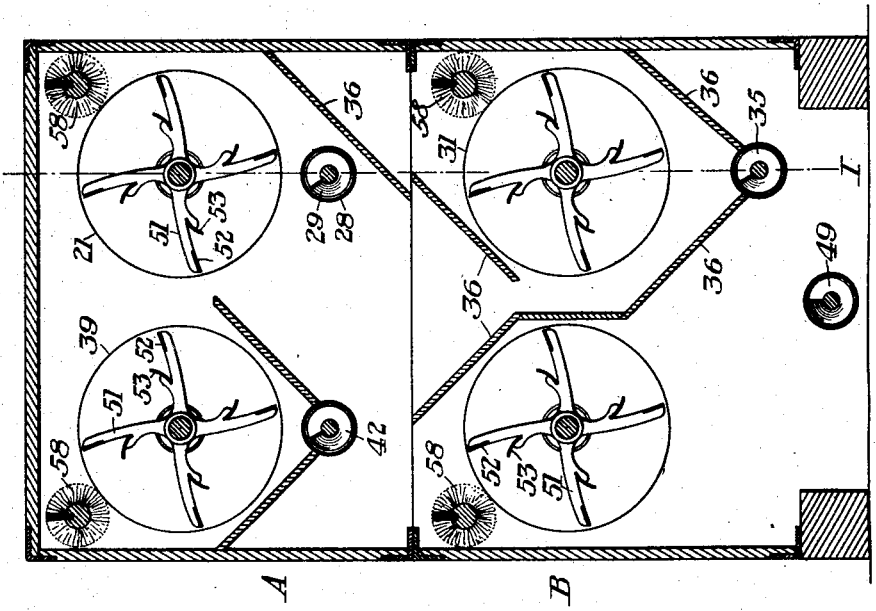
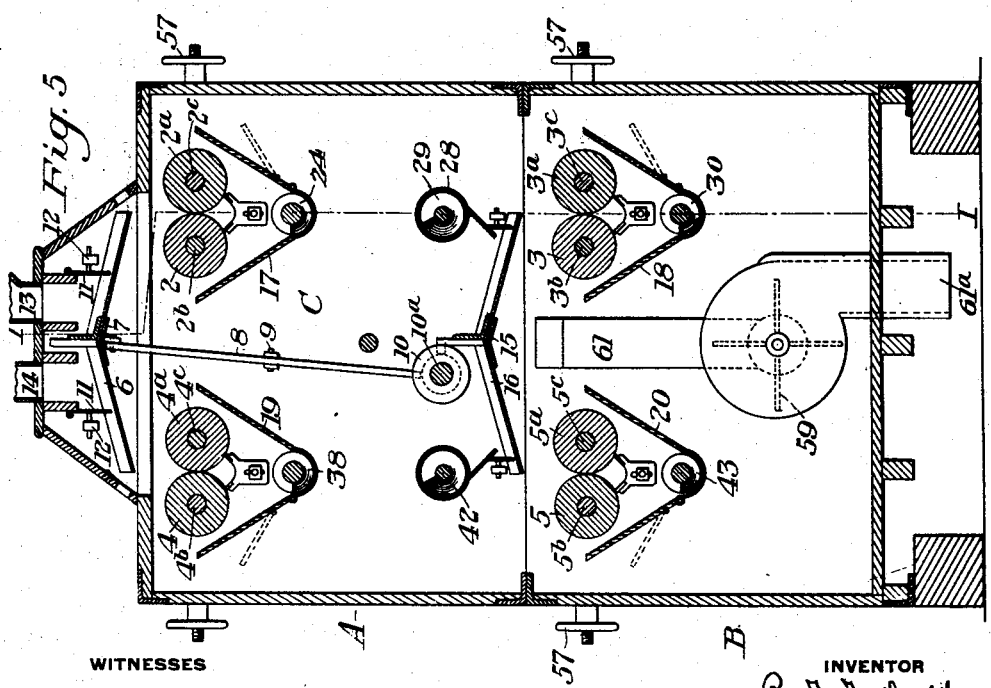

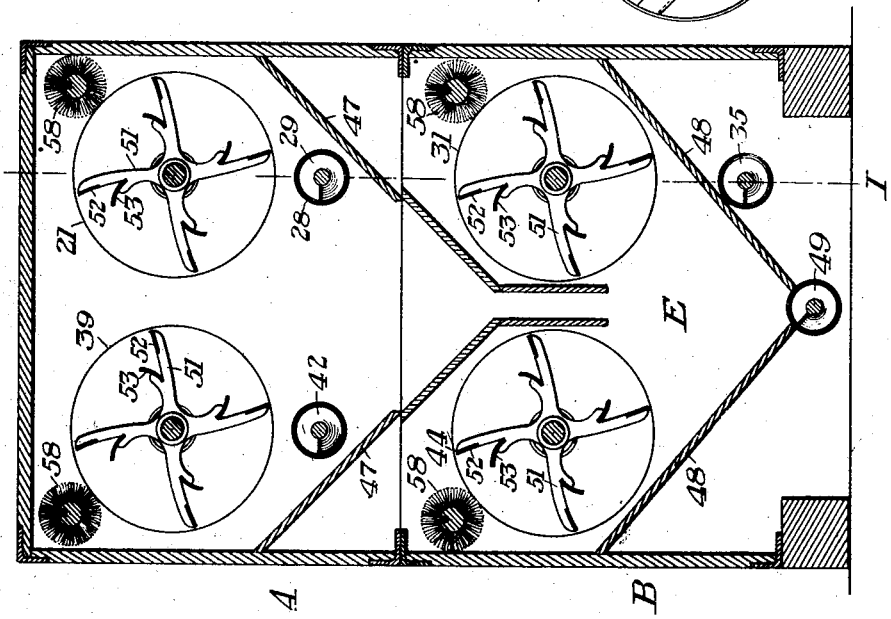

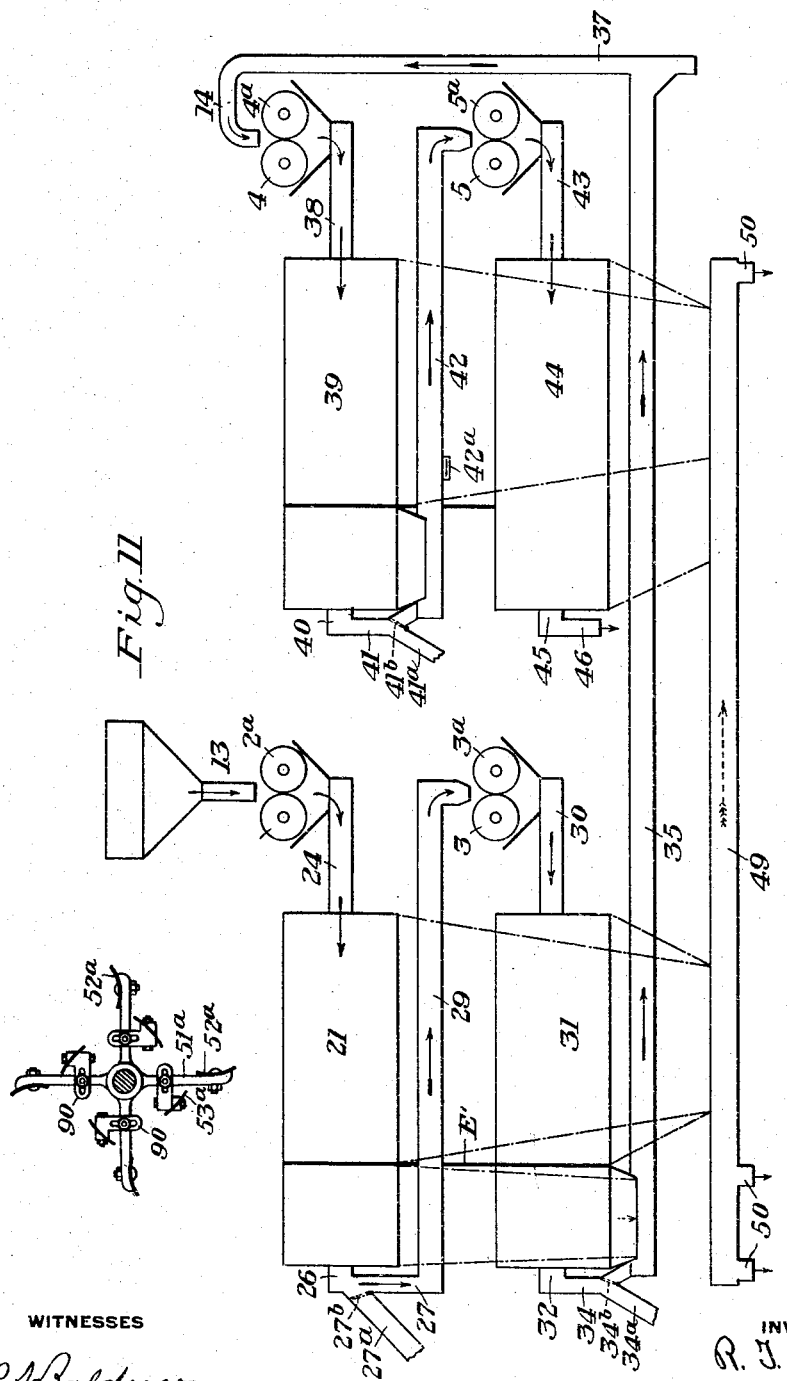

UNITED STATES PATENT OFFICE.

ROWAN T. F. DODDS, OF DECATUR, ILLINOIS.

ROLLER-MILL.

1,218,933. Specification of Letters Patent. Patented Mar. 13, 1917.

Continuation in part of application Serial No. 22,570, filed April 20, 1915. This application filed January 4, 1916. Serial No. 70,175.

*To all whom it may concern:*

Be it known that I, ROWAN T. F. DODDS, a citizen of the United States, residing at Decatur, in the county of Macon and State of Illinois, have invented a new and useful Improvement in Roller-Mills, of which the following is a full, clear, and exact description, reference being had to the accompanying drawings, forming part of this specification, in which—

Figure 1 is a longitudinal section on the lines I—I of Figs. 5, 6 and 7.

Fig. 2 is a rear view.

Fig. 3 is a front view of the machine showing all of the driving belts.

Fig. 4 is a view showing the rear end of the mill.

Figs. 5, 6 and 7 are sectional views on the lines V—V, VI—VI and VII—VII, respectively, of Fig. 1.

Fig. 8 is a detail view of the roll adjusting mechanism.

Fig. 9 is a detail view of the mechanism for agitating the feed device for the rolls.

Fig. 10 is a detail sectional view of one of the bolting reels showing the outlet end thereof.

Fig. 11 is a diagram illustrating the path of the material through the mill; and Fig. 12 is a sectional view through a modified form of agitator for the bolting reels.

My invention has relation to an improvement in roller mills, and is designed to provide a compact form of mill which can be placed on a single floor of a building, and which is so arranged that it will not be necessary to utilize elevators for carrying ground material from one floor to another during the process of grinding. My improved mill is composed of a plurality of independent mill units, each unit comprising grinding elements, a bolting reel, and a substantially horizontal conveyer for conveying ground material from the grinding elements to the bolting reel. In case the mill is composed of a plurality of units, the units, or some of them, may also be provided with horizontal return conveyers for conveying the coarser material back to the elements of a subsequent unit. The grinding elements or rolls of the mill of each unit are geared to each other, and are driven at a very high speed, which will cause a current of air to surround the rolls; and as the rolls are driven at a differential speed, there is a violent disturbance of the air which will greatly assist in grinding the material passing through the rolls, without so closely adjusting the rolls. This avoids a crushing or mashing action, which is very injurious to the flour.

My invention also covers a number of other novel features which will be hereinafter pointed out.

The precise nature of my invention will be best understood by reference to the accompanying drawings, which will now be described, it being premised, however, that various changes may be made in the details of construction and arrangement of parts without departing from the spirit and scope of my invention as defined in the appended claims.

Referring to the accompanying drawings the reference characters A and B designate complete units, each of which comprises two sets of grinding rolls, a bolting reel for each set of grinding rolls, and conveyers for conveying the material from the grinding rolls to their respective bolting reels, but I desire it to be understood that I may place a single set of grinding rolls and a reel in each unit.

Each of the units comprises a roll compartment C, a gearing compartment D and a reel compartment E which is divided into two sections by means of partition E'.

In the drawings I have shown a mill built up of two duplicate units, the mill comprising four pairs of grinding elements.

2 and $2^a$ designate the first set of rolls which are mounted on shafts $2^b$ and $2^c$ respectively. 3 and $3^a$ are rolls in the unit B immediately below the rolls 2 and $2^a$, which are connected to shafts $3^b$ and $3^c$. Placed within the unit A at the side of the rolls 2 are rolls 4 and $4^a$, which are connected to shafts $4^b$ and $4^c$. 5 and $5^a$ designate the last set of rolls which are located immediately below the rolls 4 and $4^a$ and adjacent to the rolls 3 and $3^a$ in the unit B, and which are connected to shafts $5^b$ and $5^c$ respectively. The various shafts in the rolls are driven as hereinafter described so that one roll of each set will be driven at a higher rate of speed than the other roll of the set.

Immediately above the compartment C is a feeding compartment having a feeding device 6 for the rolls 2 and $2^a$ and 4 and $4^a$, and which comprises a pair of slanting boards which are slidably mounted on a guide 7 to permit the device to be vibrated to gradually feed the grain to the rolls. The feeding device is vibrated by means of a lever 8 pivotally connected at 9, and which engages a groove in the cam 10 mounted on a shaft 10ª, so that the feeding device 6 is continuously vibrated when the mill is in operation. Pivotally connected at a suitable point above the slanting boards or feeding device 6 are swinging gates 11, which are normally held in their vertical positions by weights 12. The material is fed between the lower edge of these gates and the slanting boards, and by adjusting the weight on these gates the feed can be varied. 13 designates the grain chute for feeding the grain to the rolls 2 and 2ª, and 14 is a chute for feeding partially ground material to the rolls 4 and 4ª as hereinafter described.

Within the compartment C is a feeding device 16 for the rolls 3 and 3ª and 5 and 5ª which is similar to the device 6, and is vibrated by means of the cam 10. This feeding device is supported by means of a guide 15. 17, 18, 19 and 20 designate hoppers below the sets of rolls 2, 2ª, 3, 3ª, 4, 4ª, and 5, 5ª. The material is fed from the hopper 17 to the reel 21 from the rolls 2 and 2ª through a tubular conduit 22 which extends from the compartment C to the compartment E. This tube comprises a sleeve member 23 which is connected to the head of the reel 21 and is journaled on the tube 22 connected to the wall of the compartment C. In the drawings I have shown the tube 22 formed of two members, the inner of which is provided with a series of spirals to assist in disintegrating the material fed from the hopper 17 to the bolt 21. Rotatably mounted within the tube 22 is a conveyer 24, which is journaled in bearings on opposite ends of the unit A and is adapted to be rotated to feed the material from the hopper 17 to the reel 21. The reel 21 may be of any approved type having coarse and fine cloth, the fine cloth being in the right hand end of the compartment E, while the coarser cloth is on the left hand end of the reel within the small compartment.

The shaft of conveyer 24 extends entirely through the unit and is provided with a conveyer 25 on its opposite end within a tubular outlet 26, which communicates with a chute 27, the lower end of which communicates with a tube 28 having a conveyer 29 therein, for conveying the coarse material which is not passed through the bolting cloth on the reel 21 back to compartment C and depositing it on the right hand slanting boards 16 and then fed to the rolls 3 and 3ª. The material passing through rolls 3 and 3ª is taken by means of a conveyer 30 to the bolting reel 31 through a tube similar to the tube 22. The coarse material which will not pass through the bolting cloth is fed out through the central outlet 32 by conveyer 33, and passes off through a chute 34 to a suitable feed bin.

Rotatably mounted below the reel 31 is a rotary conveyer 35, which is incased in a suitable tube and which is only open in the left hand side of the compartment E, so that the material passing through the coarse bolting cloth on reels 21 and 31 will pass down over suitable cant boards 36 to the conveyer 35. The right hand end of the tube surrounding the conveyer 35 communicates with an elevator 37 which conveys the partially ground material to the top of the mill and feeds it through chute 14 to the left hand slanting board of the feed device 6, which in turn feeds the material to the rolls 4 and 4ª. The ground material from the hopper 19 is fed by means of a conveyer 38 to the bolting reel 39. The coarse material which will not pass through the cloth will be fed out through the central tube 40 by means of a conveyer similar to the conveyer 25 to the chute 41 and passes off to the feed, while the coarse material which passes through the coarse cloth will be fed by means of a conveyer 42 to the left hand slanting board of the feed device 16 and from there to the rolls 5 and 5ª. The material which passes between the rolls 5 and 5ª to the hopper 20 will be fed by means of conveyer 43 to the bolting reel 44, the coarse material therefrom passing out through the central outlet 45 to a feed chute 46.

As the conveyers 30, 38 and 43 are similar to the conveyer 24, I have not described the details of construction of each of these conveyers.

Placed within the larger end of the compartment E and at the right hand side of the partition E' are the cant boards 47 for conveying the flour which passes through the fine cloth on the reels 21 and 39 to the hopper 48 below the reels 31 and 44. 49 is a conveyer in the bottom of the hopper 48 for conveying the flour to suitable exits 50.

Connected to each of the shafts of the conveyers 24, 30, 38 and 43 within their respective bolting reels are spiders 51, and connected to the outer ends of the arms of these spiders are blades 52. 53 are blades connected to the arms between the ends thereof and the shaft, the blades 53 being so shaped that they create a slight suction within the reel. This suction acts to draw the lighter or woody parts of the ground material toward the center of the bolt or reel, the weight of which material is about one-fifth of the weight of the flour. As the blades 52 and 53 extend more or less in a helical direction, this light woody material or ash will be moved toward the tail end of the reel. This tendency of the material to be moved in this direction is also increased by the fact that the outlet is at this end, this outlet affording the only means for the escape of the air which is drawn into the reel through the bolting cloth by the suction action. The light material is therefore forced out through the openings leading from the center of the reel and passes therefrom into the chutes extending from the ends thereof.

One roll of each set is journaled in hangers 54 pivotally connected to the frame of the machine at 55, and 56 is a spring pressed plunger which is adjusted by means of a hand wheel 57 for adjusting the position of one of each of the rolls with relation to its companion roll.

Rotatably mounted in suitable bearings within the compartment E are brushes 58, there being one brush for each of the bolting reels.

Mounted within the compartment G is an exhaust fan 59 having connections 60 to the upper portion of the compartment E, and 61 is a similar connection leading to the interior of the compartment C. These fans are adapted to exhaust the lighter materials or dust from the mill, and pass out through the outlet 61$^a$.

Connected to a shaft 10$^a$, (which may be considered as the main driving shaft) is a driving pulley 62 which may be connected by means of a belt with any suitable power shaft, and connected to this shaft 10$^a$ is a pulley 63 which is connected by means of a belt 64 with pulleys on shafts, 2$^b$, 3$^b$, 4$^b$ and 5$^b$ respectively, of the rolls 2, 3, 4 and 5, so that these rolls are driven directly from the power shaft. Connected to the shaft 10$^a$ is a second pulley 65 which is connected by means of a belt 66 with pulleys 24$^a$, 30$^a$, 38$^a$ and 43$^a$ which are connected to the shafts of the conveyers 24, 30, 38 and 43 respectively.

Connected to the shafts 2$^c$, 3$^c$, 4$^c$ and 5$^c$ of the rolls 2$^a$, 3$^a$, 4$^a$ and 5$^a$, respectively, at the rear end of the mill are pulleys which are driven by means of a belt 67 which engages a pulley 68 on a shaft 69, and which is driven by means of a pinion 70 on the shaft 10$^a$ which meshes with a gear wheel 71 on the shaft 69. It will be noted that the pinion 70 is considerably smaller than the gear wheel 71, so that the shaft 69 will be driven at a slower rate of speed than the shaft 10$^a$, and as the pulleys on all of the roll shafts are approximately the same diameter and the driving pulleys 63 and 68 are approximately the same diameter, the rolls 2, 3, 4 and 5 will be driven at a slower rate of speed than the rolls 2$^a$, 3$^a$, 4$^a$ and 5$^a$.

Connected to this shaft 69 are sprocket wheels 72, 73 and 74. The sprocket wheel 72 is connected by means of a sprocket chain with a sprocket wheel 75 on the sleeve of the bolting drum 31. Connected to the sleeves of the various bolting drums are sprocket wheels 76; and 77 is a sprocket chain connecting the four sprocket wheels 76 to each other, so that the four bolting reels will be rotated at the same rate of speed and in the same direction. Connected to the shaft of the conveyer 49 is a sprocket wheel 78 which is connected by means of a sprocket chain with a wheel 73 on the shaft 69, and connected to the opposite end of the shaft of the conveyer 49 is a sprocket wheel 79 which is connected by means of a chain 80 with a sprocket wheel 81 on the end of the conveyer 35. The sprocket wheel 74 is connected by means of a sprocket chain 82 with sprocket wheel 83 which is connected to the shaft of the upper wheel of the elevator 37. Connected to the left hand end of the conveyer shaft 25 is a pulley 84 which is connected by means of a belt 85 with a pulley wheel 86 on the shaft of the conveyer 29. The conveyer 42 is driven by means of a similar connection with the conveyer 38.

In Fig. 12 I have shown a modified form of bolting reel in which I have designated similar parts with the same reference character with the letter "a" affixed.

In this construction the outer blades 52$^a$ are connected to the outer ends of arms of the spiders 51$^a$, while the blades 53$^a$ are connected to supports 90. These supports 90 are provided with slots for the reception of securing bolts for adjustably connecting the supports to the arms of the spiders and are arranged to permit the adjustment of the blades 53$^a$ to vary the centripetal action thereof on the light woody particles.

The operation of the device for making flour is as follows:

The whole wheat is fed through the chute 13 to the rolls 2 and 2$^a$, and the ground material from the rolls 2 and 2$^a$ is fed by means of conveyer 24 to the bolting reel 21. The flour which falls through the fine mesh of the bolting reel passes directly to the hopper 48, while the coarse material which passes through the coarse mesh of the bolting cloth passes directly to conveyer 35. The material which passes from the outlet 26 from reel 21, passes to conveyer 29 and is fed back to the second set of rolls 3 and 3$^a$. The material which passes through rolls 3 and 3$^a$ is fed by means of conveyer 30 to the bolting reel 31. The flour passing through the fine mesh of the bolting cloth passes directly to the hopper 48, while the coarse material which passes through the coarser portion of the bolt passes directly to the conveyer 35; and the material which passes out through the central outlet at the tail end passes off through chute 34 to the feed bin. The material which is passed through the coarse cloth of the reels 21 and 31 is fed by conveyer 35 to the elevator 37, and is elevated to the top of the mill and is fed to the third set of rolls 4 and 4$^a$ through chute 14. The partially ground material is then fed by conveyer 38 to the bolting reel 39, the flour which passes through the fine mesh of the cloth passes directly to the hopper 48, while the coarser material which passes through the coarse mesh of the cloth is returned by the conveyer 42 to the last set of rolls 5 and 5ª. The ground material from the rolls 5 and 5ª is fed by conveyer 43 to the bolting reel 44, and as this reel is provided with fine bolting cloth throughout the entire length, any flour which passes through the cloth is fed directly to the hopper 48, and from which it is removed by means of the conveyer 49. The coarse material fed from the bolting reel 44 through the central outlet in the tail of the reel passes off to a feed box or bin through the chute 46.

In the foregoing description I have described the mill and operation for making flour from wheat, but I may equip the mill with various other chutes and valves so that I can readily make whole wheat flour, or grind rye or buck wheat, without any change, with the exception of shifting the valves. In order to clearly illustrate this arrangement of valves and chutes I have shown them in connection with Fig. 11. Connected to chutes 27, 34 and 41 are offtake chutes 27ª, 34ª and 41ª, respectively; and 27ᵇ, 34ᵇ and 41ᵇ are valves in the respective chutes. These valves are adapted to direct the material from the respective bolting reels to the conveyers leading to the next set of rolls or to the chutes leading directly to the storage bins. 42ª is a gate in the tube of the conveyer 42, and when said gate is open and the valve 41ᵇ is shifted to the position to pass the material from the tube 40 to the tube of the conveyer 42, all of the material from the rolls 4 and 4ª will be passed to the flour bin.

The advantages of my invention are numerous. It will be noted that each of the units composing the mill is structurally separate and independent of the other units, so that any desired number of such units can be used in the construction of any particular mill, according to the purpose for which it is intended. The driving mechanism for these units is so arranged that the belt connections for driving the grinding elements and the conveyer shafts can be readily made at the ends of the compartment C. The arrangement of the driving mechanism is very flexible, enabling the driving connections to be made to any desired number of units. The driving connections for the external members of the bolting reels, it will be noted, are located intermediate the grinding elements and the bolting reels, thus leaving the tail end of the machine free from all driving mechanism and greatly facilitating inspection of the operation of the mill.

It will be further noted that all the conveyers are substantially horizontal screw conveyers, with the exception of the one bucket elevator for conveying the material from the lower bolting reel on one side of the mill to the top of the mill. The feature of providing the bolting reels with sleeve extensions at their head ends and providing such sleeve extensions with interiorly arranged disintegrating means, causes the material from the grinding elements to be delivered to the bolting reels in a condition free from flakes, and whereby a most effective separation of the flour particles can be effected in the reel. The sleeve extensions also form driving members, and the connections from one reel to another can readily be made from these extensions. A further advantage of my invention results from providing feed means in the conveyer passage of some of the reel units, whereby the material therein can be directly discharged without passing to another set of grinding elements. This enables me to use the same mill in the manufacture of Graham or whole wheat flour, or the grinding of buck wheat or rye, without any change in the mill or the bolting reels. All that is necessary is to open the gates, which will permit the direct discharge into the flour bin or hopper.

As before stated, I have shown two sets of grinding and bolting elements in each unit, but if desired, each unit may comprise a single set of such elements, and the four elements superimposed one upon the other, as clearly described and shown in my application Serial No. 22,570, of which this application forms a continuation or division in part.

I claim:

1. A flour mill having a set of grinding elements, a bolting reel, a conveyer for carrying ground material from the grinding elements to the bolting reel, a screw conveyer for conveying the coarse material discharged from the bolting reel to another set of grinding elements, a conveyer casing in which the conveyer operates, and means whereby the material may be discharged from said casing directly to a flour bin or receptacle without passing to the other set of grinding elements, substantially as described.

2. A flour mill comprising a plurality of separable mill units one above the other, each unit having a set of grinding elements, a bolting reel arranged in line with each set of the grinding elements, a substantially horizontal conveyer in each unit for carrying the ground material from the grinding elements to the reel, and another substantially horizontal conveyer for returning the coarse material from the reel back to the grinding elements in another unit in a lower plane, substantially as described.

3. A flour mill comprising a plurality of mill units, each unit having a set of grinding elements, a bolting reel arranged in line with the grinding elements, a substantially horizontal conveyer for carrying the ground material from the grinding elements to the reel, and another substantially horizontal conveyer for returning the coarse material from the reel back to the grinding elements in another unit, each of said units being structurally separate from the other, and the units being superimposed one upon another, substantially as described.

4. A flour mill comprising a plurality of superimposed mill units set one upon another, and each unit being structurally independent of the other, each unit comprising grinding elements, a bolting reel and a conveyer, substantially as described.

5. A flour mill comprising a plurality of separate superimposed mill units each having a set of grinding elements, an inclosed bolting reel and a conveyer leading from the grinding elements to their respective reels, and driving means for the bolting reels located between the reels and the grinding elements, substantially as described.

6. A flour mill comprising a plurality of separate superimposed mill units each having a set of grinding elements, an inclosed bolting reel and a conveyer leading from the grinding elements to their respective reels, and driving means for the bolting reels located between the reels and the grinding elements, each reel having means for transmitting movement therefrom to a reel above it, substantially as described.

7. A flour mill comprising a plurality of separate mill units superimposed one upon another and each comprising a set of grinding elements, a rotary bolting reel, a screw conveyer, and a system of belts and pulleys for driving the grinding elements and conveyers of all of the units from driving means located on one of the units, substantially as described.

8. A flour mill comprising a plurality of separate mill units superimposed one upon another and each comprising a set of grinding elements, a rotary bolting reel, a screw conveyer, and a system of belts and pulleys for driving the grinding elements and conveyers of all of the units from driving means located on one of the units, said belts and pulleys being arranged in substantially vertical lines at the head end of the mill, substantially as described.

9. A flour mill comprising a plurality of separate mill units superimposed one upon another and each comprising a set of grinding elements, a rotary bolting reel, a screw conveyer, and a system of belts and pulleys for driving the grinding elements and conveyers of all of the units from driving means located on one of the units, said belts and pulleys being arranged in substantially vertical lines at the ends of the grinding elements, together with driving means for the bolting reels arranged intermediate said reels and the grinding elements, substantially as described.

10. A flour mill comprising a plurality of superimposed units set one upon another, each unit being structurally independent of each other, and each unit comprising two sets of grinding elements, two bolting reels, and a conveyer extending from each set of the grinding elements to its bolting reel, substantially as described.

11. A flour mill comprising a plurality of superimposed units set one upon another, each unit being structurally independent of each other, and each unit comprising two sets of grinding elements, two bolting reels, a conveyer extending from each set of the grinding elements to its bolting reel, and driving mechanism for simultaneously operating all of said parts, substantially as described.

12. A flour mill comprising a plurality of mill units, each having a set of grinding elements, a bolting reel, and a combined conveyer and disintegrator located between the respective grinding elements and their bolting reels for conveying the material from the grinding elements to the bolting reels and disintegrating the ground material during its passage through the conveyer, substantially as described.

13. A flour mill comprising a plurality of mill units, each having a set of inclosed grinding elements, an inclosed bolting reel, and a combined conveyer and disintegrator connecting each bolting reel with its respective grinding elements, means for driving the disintegrator and bolting reel, and means for driving the conveyer, substantially as described.

14. A driving mill comprising a plurality of inclosed grindng elements, a plurality of inclosed bolting reels separated therefrom, conveyer tubes connected to the bolting reels through which the material is conveyed from the respective grinding elements to the bolting reels, a conveyer located in each of said tubes, a driving pulley on the front of the machine, a pulley on each of the conveyer shafts, and a belt engaging the driving pulley and all the pulleys on the conveyers for simultaneously driving said conveyers, substantially as described.

15. A flour mill having a plurality of sets of inclosed grinding elements, a plurality of sets of bolting reels separated therefrom, a closure for said bolting reels, a conveyer tube connecting each set of grinding elements with its bolting reel, driving connections between the bolting reels and the conveyer tubes, conveyers within said tubes, means for driving said conveyers, and driving mechanism between the inclosures for the grinding elements and the bolting reels for driving the conveyer tubes and the bolting reels connected thereto, substantially as described.

16. A flour mill having a plurality of sets of inclosed grinding elements, a plurality of sets of bolting reels separated therefrom, a closure for said bolting reels, a conveyer tube connecting each set of grinding elements with its bolting reel, driving connections between the bolting reels and the conveyer tubes, conveyers within said tubes, means for driving said conveyers, driving mechanism between the inclosures for the grinding elements and the bolting reels for driving the conveyer tubes and the bolting reels connected thereto, a pulley on the shaft of one of each of the sets of grinding elements, a driving pulley, and a belt engaging said driving pulley and all the pulleys on one of the grinding elements, said pulleys and belts being located between the two casings.

In testimony whereof, I have hereunto set my hand.

ROWAN T. F. DODDS.

Witnesses:
J. A. DODDS,
J. C. HOSTETTER.

Copies of this patent may be obtained for five cents each, by addressing the "Commissioner of Patents Washington, D. C."